US010775980B2

(12) United States Patent
Goldsmith et al.

(10) Patent No.: US 10,775,980 B2
(45) Date of Patent: *Sep. 15, 2020

(54) TRANSFERRING NOTIFICATIONS BETWEEN DEVICES (71) Applicant: Google LLC, Mountain View, CA (US)

(72) Inventors: Benjamin Goldsmith, San Francisco, CA (US); Santhosh Balasubramanian, Sunnyvale, CA (US); Jennifer Shien-Ming Chen, San Francisco, CA (US); Alexander Friedrich Kuscher, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,699

(22) Filed: May 24, 2019

(65) Prior Publication Data
US 2019/0278463 A1 Sep. 12, 2019

Related U.S. Application Data (63) Continuation of application No. 14/839,860, filed on Aug. 28, 2015, now Pat. No. 10,303,345.

(51) Int. Cl.
G06F 3/048 (2013.01)
G06F 3/0484 (2013.01)
(Continued)

(52) U.S. Cl.
CPC ........ *G06F 3/04842* (2013.01); *G06F 3/0486* (2013.01); *G06F 3/04845* (2013.01);
(Continued)

(58) Field of Classification Search
CPC ............................... H04L 51/18; H04L 51/24
See application file for complete search history.

(56) References Cited

U.S. PATENT DOCUMENTS 10,303,345 B2   5/2019  Goldmsith et al.
2010/0017759 A1* 1/2010  Birnbaum ........... G06F 3/04845
                                                    715/863
(Continued)

FOREIGN PATENT DOCUMENTS

JP   H 10-124417   5/1998
JP   2011-516936   5/2011
(Continued)

OTHER PUBLICATIONS

Mozumder et al., Cloud Push: Smart Delivery of Push Notification to Secure Multi-User Support for IoT Devices; IEEE; 2020.*
(Continued)

*Primary Examiner* — Linh K Pham
(74) *Attorney, Agent, or Firm* — Shumaker & Sieffert, P.A.

(57) ABSTRACT

A system and method is disclosed for transferring notifications between multiple computing devices. A notification is provided for display at a first computing device associated with a user account. An indication is received of a user gesture for moving the notification to a second computing device associated with the user account, the second computing device being remote from the first computing device. In response to the indication, the notification is provided to the second computing device for display at the second computing device and removed from the first computing device so that the notification is no longer displayed at the first computing device.

20 Claims, 5 Drawing Sheets (51) Int. Cl.
*G06F 3/0488* (2013.01)
*G06F 3/0486* (2013.01)
*G06F 9/54* (2006.01)
*H04M 1/725* (2006.01)

(52) U.S. Cl.
CPC .......... *G06F 3/04883* (2013.01); *G06F 9/542* (2013.01); *H04M 1/725* (2013.01)

(56) References Cited

U.S. PATENT DOCUMENTS

| | | | |
|---|---|---|---|
| 2010/0306312 A1 | 12/2010 | Ryu | |
| 2011/0009133 A1* | 1/2011 | Hung | H04L 67/04 455/466 |
| 2013/0346922 A1* | 12/2013 | Shiplacoff | G06F 3/04842 715/835 |
| 2014/0095617 A1* | 4/2014 | Chan | G06F 16/20 709/204 |
| 2014/0149538 A1* | 5/2014 | Deeter | H04L 51/24 709/217 |
| 2014/0173026 A1 | 6/2014 | Buck et al. | |
| 2014/0258886 A1* | 9/2014 | Strong | H04M 1/72522 715/753 |
| 2014/0273975 A1* | 9/2014 | Barat | G06F 15/17312 455/412.2 |
| 2014/0282102 A1 | 9/2014 | Avrahami | |
| 2015/0177970 A1 | 6/2015 | Choi | |
| 2018/0227393 A1* | 8/2018 | Daub | H04L 67/20 |

FOREIGN PATENT DOCUMENTS

| | | |
|---|---|---|
| KR | 10-2011-0052629 | 5/2018 |
| WO | WO 2010/009157 | 1/2010 |
| WO | WO 2015/063879 | 3/2017 |

OTHER PUBLICATIONS

Korean Notice of Allowance dated Oct. 25, 2019, from Korean Patent Application No. 2017-7031386, 3 pages including English language translation.
Korean Office Action dated Mar. 20, 2019, which issued in Korean Patent Appication No. 10-2017-7031386. 15 pages including English language translation.
Internationai Search Report and Written Opinion dated Oct. 13, 2016, which issued in International Application No. PCT/US2015/044500.
Anonymous, "Growl for Windows—How to set up forwarding." Jun. 2015, retrieved from http://web.archive.org/web/20150626222300/http://www.growlforwindows.com/gfw/help/forwarding.aspx, 13 pages.
Anonymous, "prowl—iOS Push Notifications." Jul. 2015. Retrieved from http://web.archive.org/20150703044723/http://www.prowlapp.com, 3 pages.
Prosecution History from U.S. Appl. No. 14/839,860, dated Aug. 21, 2017 through Apr. 23, 2019, 123 pp.
Decision to Grant, and translation thereof, from counterpart Japanese Application No. 2017-556680, dated Apr. 15, 2019, 5 pp.
Search Report, and translation thereof, from counterpart Japanese Application No. 2017-556680, dated Feb. 27, 2019, 16 pp.
Communication Pursuant to Rules 161(1) and 162 EPC dated Apr. 6, 2018, from counterpart European Application No. 16750329.1, 3 pp.
Response to Communication Pursuant to Rules 161(1) and 162 EPC dated Apr. 6, 2018, from counterpart European Application No. 16750329.1, filed Oct. 12, 2018, 24 pp.

* cited by examiner

TRANSFERRING NOTIFICATIONS BETWEEN DEVICES

CROSS REFERENCE TO RELATED APPLICATIONS

This application is a continuation application of U.S. application Ser. No. 14/839,860, entitled "TRANSFERRING NOTIFICATIONS BETWEEN DEVICES," filed on Aug. 28, 2015, the entirety of which is incorporated herein by reference.

TECHNICAL FIELD

The subject technology relates generally to notifications provided to and from computer-related applications.

BACKGROUND

Many software applications, including those applications related to social media, provide user notifications. These notifications may inform a user of that a message of interest has been received for the user or that content or social activity of interest to the user has been made available to a social stream, forum, application, or other medium in which the user is involved. The user may read or open the notification to learn more about the message, content, or social activity associated with the notice. In some instances, the user may have the option to dismiss the notification without further review.

SUMMARY

The subject technology provides a system and computer-implemented method for transferring notifications between multiple computing devices. In one or more implementations, a computer-implemented method comprises providing for display a notification at a first computing device associated with a user account, receiving an indication of a user gesture for moving the notification to a second computing device associated with the user account, the second computing device being remote from the first computing device, and, in response to the indication of the user gesture and without user interaction, providing the notification to the second computing device for display at the second computing device and removing the notification from the first computing device so that the notification is no longer displayed at the first computing device. Other aspects include corresponding systems, apparatuses, and computer program products for implementation of the computer-implemented method.

In one or more implementations, a system comprises one or more processors, and a memory media having instructions stored thereon. When executed, the instructions cause the one or more processors to provide for display a notification at a first computing device authenticated to a user account, receive an indication to move the notification to a second computing device associated with the user account, the second computing device being remote from the first computing device, and, in response to the indication and without user interaction, providing the notification to the second computing device for display at the second computing device and expiring the notification from the first computing device. Other aspects include corresponding apparatuses, methods, and computer program products for implementation of the foregoing system.

In one or more implementations, a machine-readable media includes instructions that, when executed, perform a method comprising providing for display a notification at a first computing device associated with a user account, receiving an indication of a user gesture for moving the notification to a second computing device associated with the user account, the second computing device being remote from the first computing device, and, in response to the indication of the user gesture and without user interaction, providing the notification to the second computing device for display at the second computing device and removing the notification from the first computing device so that the notification is no longer displayed at the first computing device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology enables a user to transfer—or dismiss—notifications received at a first device from the first device to a second device for later reading at the second device. According to various aspects, the user may register multiple devices with a user account. Applications that are installed on each device may also be registered with the user account so that notifications provided by or to the applications may be dispatched to the device via the user account. In this regard, a notification may be provided for display at any computing device associated with the user account. The notification may be displayed, for example, by an application associated with the notification or a virtual desktop provided by an operating system of a user's device.

When the notification is displayed at a first device, the user may select to read the notification, or dismiss the notification. In some aspects, the notification may be dismissed completely by a first type of user gesture, such as by a finger swipe over a portion of the display screen corresponding to the notification to move the notification off the screen. According to the subject technology, the user may also transfer the notification to a second computing device associated with the user account by way of a second type of user gesture. In one or more implementations, the second type of user gesture may comprise partially swiping the displayed notification to reveal selections for different devices associated with the user account. As will be further described below, a user may swipe the notification to the right, revealing an available device for receiving the notification. The user may stop the finger swipe action and then manually select the revealed selection corresponding to the device which the user wishes to transfer the notification. Alternatively, the user may stop the swipe action at the desired selection, triggering the most recently revealed selection by lifting the user's finger from the screen.

In response to the second type of user gesture and selection of the device to which the notification is to be provided, the notification is, without further user intervention, associated with the selected computing device. The notification may then be removed from the first computing device so that the notification is no longer displayed by the first computing device. When the user interacts with the second computing device the transferred notification may be displayed as if it were sent directly to the device. Additionally or in the alternative, the notification may provide some information informing the user of the prior transfer.

In one or more embodiments, the subject technology enables a user to transfer execution of an application associated with a notification to a different device. For example, on selecting to view certain content associated with the notification, the operating system may prompt the user to select from a list of applications capable of displaying or executing the content. One of the selections may include opening the content in an application operating on a second device. When this option is selected a notification for opening the content is forwarded to the second device. When the second device is used, the user will be notified that the content has been designated to be opened on the second device and may confirm opening of the content on the second device by way of the notification.

Figure 1:
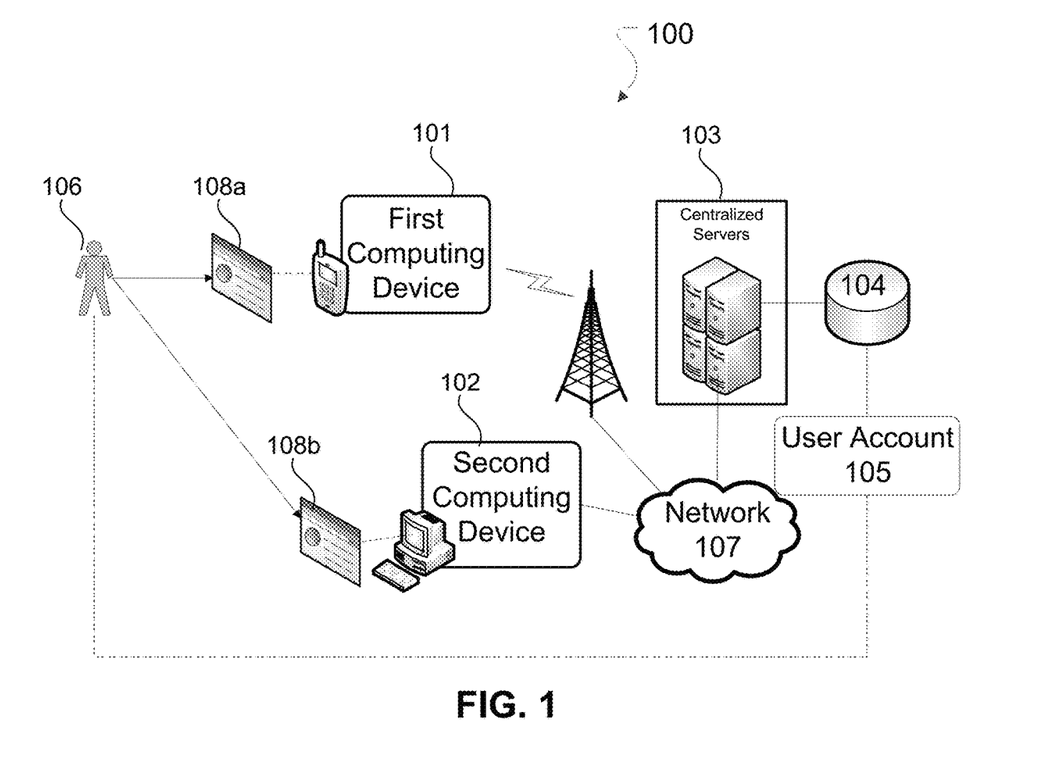
FIG. 1 is a diagram of an example system for transferring notifications between multiple computing devices.

FIG. 1 is a diagram of an example system 100 for transferring notifications between multiple computing devices, according to one or more aspects of the subject technology. A system 100 may include one or more computing devices 101, 102 (for example, a smartphone, tablet or notebook computer, personal computer, PDA, or the like), one or more centralized servers 103, and a remote storage 104 (for example, a database).

According to various implementations, computing devices 101 and 102 may be tied to a user account 105. Accordingly, a user 106 is authorized to use certain features of a respective device 101, 102 by authenticating to user account 105. User account 105 may be, for example, a cloud-based or web-based user account or may be an enterprise account (e.g., LDAP account), and may function as a universal account for multiple devices. In this regard, information stored in connection with the user account may be centrally located on a third computing device, for example, on a server 103 (e.g., in a "data cloud"). Server 103 may be operably connected to, for example, first and second computing devices 101, 102 over a network 107 (for example, a LAN, WAN, WiFi, cellular network, or the Internet). Remote storage 104 may store information in connection with user account 105. The functionality of server 103 and remote storage 104 may be implemented on the same physical server or distributed among a plurality of servers. Moreover, remote storage 104 may take any form such as relational databases, object-oriented databases, file structures, text-based records, or other forms of data repositories.

Accordingly, when a notification related to user account 105 or a software application associated with user account 105 is received the notification may be dispatched from the user account to any of the "account-linked" devices, including computing device 101 and computing device 102. Similarly, when a notification or data associated with a notification is received, input, or stored on either computing device 101 or computing device 102 the notification and/or data may be automatically replicated or co-located to the centrally located user account on server 103.

The various connections between computing devices 101 and 102, server 103, and storage 104 may be made over a wired or wireless connection. Computing devices 101 and 102 may be co-located within a defined area. For example, the devices may be connected to the same LAN or WiFi network. Computing devices 101 and 102 may be in different locations such as at the user's home and place of employment. According to various aspects, computing devices 101 and 102 may be configured to load and execute one or more user interfaces 108a, 108b for interaction with one or more software applications, including web-applications provided by, for example, server 103. A user interface 108 may include an interface provided by a desktop or mobile operating system, or an interface provided by a stand-alone application (e.g., a web-browser or web-enabled application) executing on the device and managed by the operating system. As will be discussed further, the user interface of each device may receive and display notifications provided to or by applications operating on the devices or user account 105.

In one example, a notification may be provided at first computing device 101 for display at a user interface 108a operating on computing device 101. User 106 may interact with the user interface (e.g., via a user gesture or pointer interaction) to indicate that the notification should be moved (e.g., transferred or relocated) to second computing device 102. In response to the user interaction, the notification may be provided to second computing device 102 for display at a user interface 108b of second computing device 102. The notification may then be automatically disassociated from first computing device 102 (e.g., in the user account) so that the notification can no longer be displayed at the first computing device.

Figure 2:
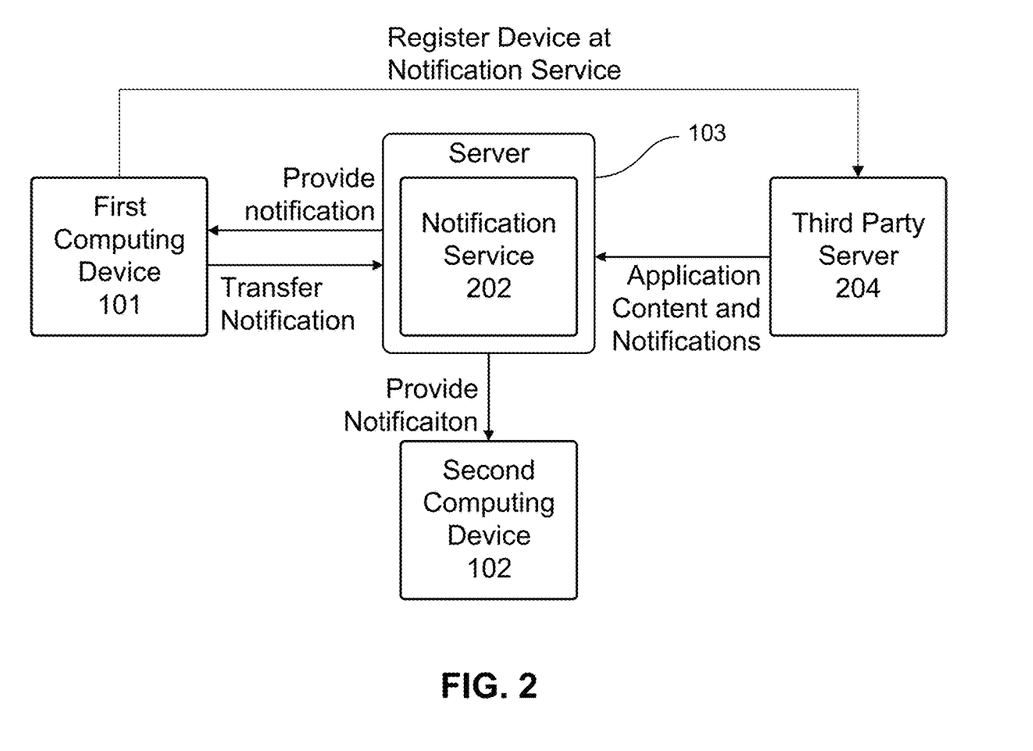
FIG. 2 depicts example components and data flow for transferring notifications between multiple computing devices.

FIG. 2 depicts example components and data flow for transferring notifications between multiple computing devices, according to one or more aspects of the subject technology. A notification service 202 may propagate push notifications to devices 101, 102 having applications registered to receive those notifications. Each device (e.g., device 101 or 102) establishes a connection with the notification service and receives notifications over this connection. The connection may be a persistent connection. Providers of the registered applications connect with notification service 202 while monitoring incoming data intended for their client applications. When new data for an application arrives, the provider prepares and sends a notification to notification service 202, which pushes the notification to the target device.

To receive notifications for applications operating (e.g., executing, running, etc.) on each computing device, each computing device (101, 102) may register the relevant applications with notification service 202, which may be operating on a server 103 remote from the respective devices. Server 103 may associate each application on the device with a token which is then provided to a remote application server 204 responsible for sending notifications to the application. The token is registered with a user account at remote application server 204 and, when a notification is to be sent to a user of the user account, the notification and token are sent to notification service 202 and the token informs notification service 202 of the device and/or user to which the notification should be sent. For the purposes of this disclosure the user account on remote application server 204 may or may not be the same as user account 105.

Notification service 202 may receive a notification associated with an application operating on first computing device 101 from remote application server 204. Notification service 202 sends the notification to first computing device 101 based on predetermined registration information for the application and first computing device 101. As described above, the registration information may be the association between device 101, the application, and matching a token received from remote application server 204 with a previously generated token for the device, application, and/or user.

Notification service 202 may later receive an indication to move the notification to a second computing device associated with the user account. As will be described later with regard to a user interface operating on first computing device 101, the indication may be a result of a gesture or other interactive action performed by a user with regard to the notification. On receiving the indication, first computing device 101 may initiate transfer of the notification to second computing device 102. In this regard, notification server may receive the notification (or at least a portion thereof) and an identification of second computing device 102 from first computing device 101. The notification may then be sent to second computing device 102 based on the received identification of second computing device 102 and predetermined registration information for second computing device 102. In one or more implementations, notification service 202 may receive the notification without such identification and hold the notification until the notification can be delivered to the next operably connected device (e.g., when the next device is authenticated to user account 105).

Additionally or in the alternative, the notification service 202 may store notifications to be delivered to registered devices and remove the notifications when they are permanently dismissed by a user associated with user account 105. In one or more implementations, each notification may be associated, at notification service 202, with a respective device and/or user account. For example, a received notification may be associated at notification service 202 with first computing device 101. When the notification is designated to be transferred from first computing device 101 to second computing device 102, a notification identifier for the notification may be received from first computing device 101 and the notification identifier used to index the stored notification at notification service 202. Notification service 202 may then associate the notification with second computing device 102 and store the association. The notification may also be removed from being displayed later by first computing device 101 by removing the association between the notification and first computing device 101.

In one or more implementations, a notification may include application content that is executable or displayable by a predetermined application. For example, the notification may include email content that is formatted for a particular email application. Additionally or in the alternative, the notification may include content in a format for a social network application. Accordingly, when the notification is opened, the computing device on which it is opened may attempt to open the application associated with the notification to display the notification content. In this regard, the operating system may display one or more predetermined applications managed by the operating system and associated with the notification content, and prompt the user to select one of the applications for opening and displaying the notification.

User account 105 may be updated with and store an enumeration of applications installed on each "account-linked" device. In this regard, when a notification is sent to first computing device 101, server 103 may also send a description of one or more applications operating on the second device that are capable of displaying the application content. Server 103 may receive a selected one of the applications from first computing device 101 and then send the notification to second computing device 102 with an indication of the selected application for opening the notification content on second computing device 102.

Figure 3:
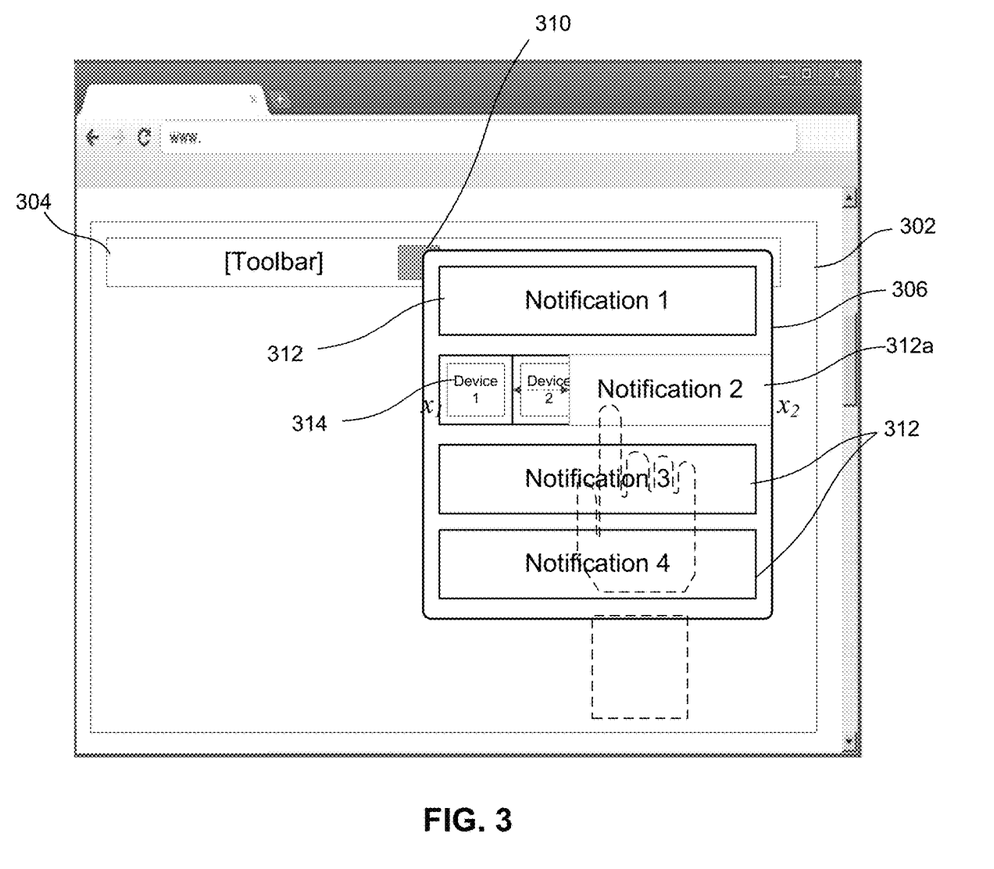
FIG. 3 depicts an example user interface, including an example toolbar and an example notification list.

FIG. 3 depicts an example user interface 302, including an example toolbar 304 and an example notification list 306, according to one aspect of the subject technology. User interface 302 may be displayed on a client computing device 101, 102 (e.g., on interface 108a or 108b). Accordingly, user interface 302 may be displayed on, for example, a smartphone, GPS navigation device, or personal computer, tablet computer, PDA, a television or other display device with one or more location-aware computing devices embedded therein or attached thereto, or the like. User interface 302 may be integrated with an operating system (e.g., as a virtual desktop) or for an application, such as a web browser 308 or a social network application.

Toolbar 304 may include a number of virtual buttons and other controls for the manipulation of one or more application features. Toolbar 304 may include a control 310 that, when activated, displays notification list 306, above and at least partially overlapping user interface 302, including, for example, one or more applications or application features. In some aspects, notification list 306 may float, and may be repositioned by a user. Notification list 306 may be generated, for example, by instructions provided by the operating system or embedded within an associated application (for example, scripting language embedded within a webpage).

Notification list 306 may include one or more notifications 312 as graphic elements. Each notification 312 may be generated as a result of a recent activity generated by or within a corresponding application and include, for example, notification content describing the activity. Each notification 312 may have been provided to notification service 202 from one or more remote application servers 204, which then forwarded the notification to the device upon which notification list 306 is displayed for a user of a user account 105 associated with the device. In this manner, notification list 306 may provide a listing of activities that are of interest to the user associated with user account 105. In one or more implementations, each notification 312 may function as a visual link to an application associated with the notification, such that, when activated (for example, by clicking or tapping on an area of a display screen corresponding to notification 308) the application is opened and the notification displayed by the application.

According to aspects of the subject technology, each notification 312 may be displayed together with one or more graphical control elements 314 for moving the notification to one or more other respective computing devices, including, for example, second computing device 102. First computing device 101 may receive, from notification service 202, an enumeration of the computing devices that are associated with user account 105, and display each of the graphical control elements with the notification to represent a respective one of the computing devices associated with user account 105 to which the notification may be transferred. The user may then either activate the notification to view the notification on present device, or activate one of graphical control elements 314 to transfer the notification to another device.

Accordingly, user interface 302 and/or notification list 306 may be generated by and/or include code to initiate moving the notification to one of the computing devices represented by a graphical control element 314. In this regard, first computing device may receive an indication of a user gesture for moving the notification to second computing device 102. The user gesture may include a selection of one of the graphical control elements 314 corresponding to second computing device 102. In response to the user gesture and/or selection of a graphical control element 314 corresponding to a selected notification 312a, the selected notification may be provided to second computing device 102 for display at second computing device 102. Notification 312a may then be dismissed or removed from first computing device 101 so that the notification is no longer displayed at the first computing device.

In one or more implementations, graphical control elements 314 are displayed by initiation of a user gesture such as swiping notification 312a. In this regard, a notification 312 may be visually moved by a user gesture from the notification list in a direction away from its starting position, for example, in a direction from $x_1$ to $x_2$. The gesture may include a finger swipe over a portion of a display screen associated with the display of the notification. As depicted in FIG. 3, movement of notification 312a may reveal graphical control elements 314 from underneath at least a portion of the notification as the visual representation of the notification is moved from $x_1$ to $x_2$. Additionally or in the alternative, graphical control elements 314 may be displayed upon selection of notification 312a (e.g., before it is opened by a corresponding application), or displayed on the notification such as to be selectable while reading the notification.

Notification 312a is dispatched to second computing device 102 when a selected one of the graphical control elements 314 corresponding to second computing device 102 is activated. In one or more implementations, a graphical control element 314 may be activated, for example, when the finger swipe is released upon display of the selected graphical control element.

Figure 4:
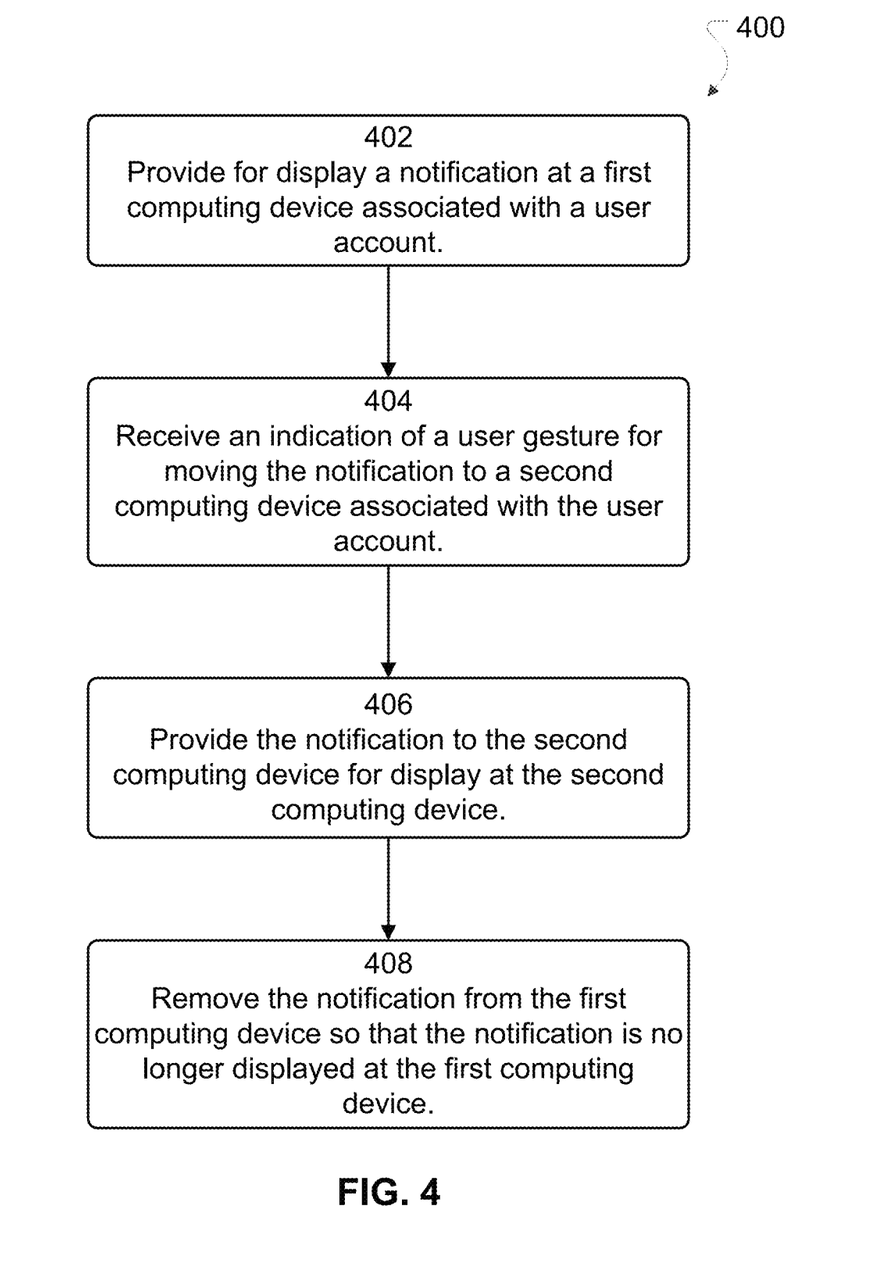
FIG. 4 depicts a flow diagram of an example process for transferring notifications between multiple computing devices.

FIG. 4 depicts a flow diagram of an example process 400 for transferring notifications between multiple computing devices, according to aspects of the subject technology. For explanatory purposes, example process 400 is described herein with reference to the components of FIG. 1, FIG. 2, and FIG. 3. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

In the depicted example flow diagram, server 103 and/or notification service 202 provides for display a notification 312 at a first computing device 101 associated with a user account 105 (402).

As described previously, notification 312 may be received by notification service 202 from a remote application server 204 associated with an application operating on first computing device 101. The notification may then be sent to first computing device 101 based on predetermined registration information for the application and the first computing device. The notification may then be displayed in a user interface (e.g., user interface 108, 302) together with one or more graphical control elements 314 for moving the notification to one or more other respective computing devices including, for example, second computing device 102.

An indication of a user gesture for moving the notification to a second computing device associated with the user account is received (404). According to various aspects, second computing device 102 is physically remote from first computing device 101. The indication of the gesture may include an indication that a selected one of the graphical control elements corresponding to the second computing device is activated.

In response to the indication of the user gesture and without user interaction, the notification 312 is provided to second computing device 102 for display by a user interface of second computing device 102 (e.g., on a user interface 302) (406). The notification may be provided to second computing device 102 by, for example, sending the notification based on an identification of the second computing device received from first computing device 101 and predetermined registration information for the second computing device stored at server 103.

In one or more implementations, an association between the notification and first computing device 102 may be stored at notification service 202 (e.g., in storage 104) when the notification is received from a remote application server 204. A copy of the notification may then be sent to first computing device 101. When the notification is provided to second computing device 102 as a result of a user action at first computing device 101, first computing device 101 may signal server 103 to update the association with second computing device 102.

Notification 312 is then removed from first computing device 101 so that the notification is no longer displayed at first computing device 101 (408). Notification 312 may be dismissed after being read by a user or by way of a gesture to dismiss the notification. Notification 312 may also be dismissed upon transfer of the notification to second computing device 102.

Many of the features in the above-described example process 400, and related applications, may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media, by itself, does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
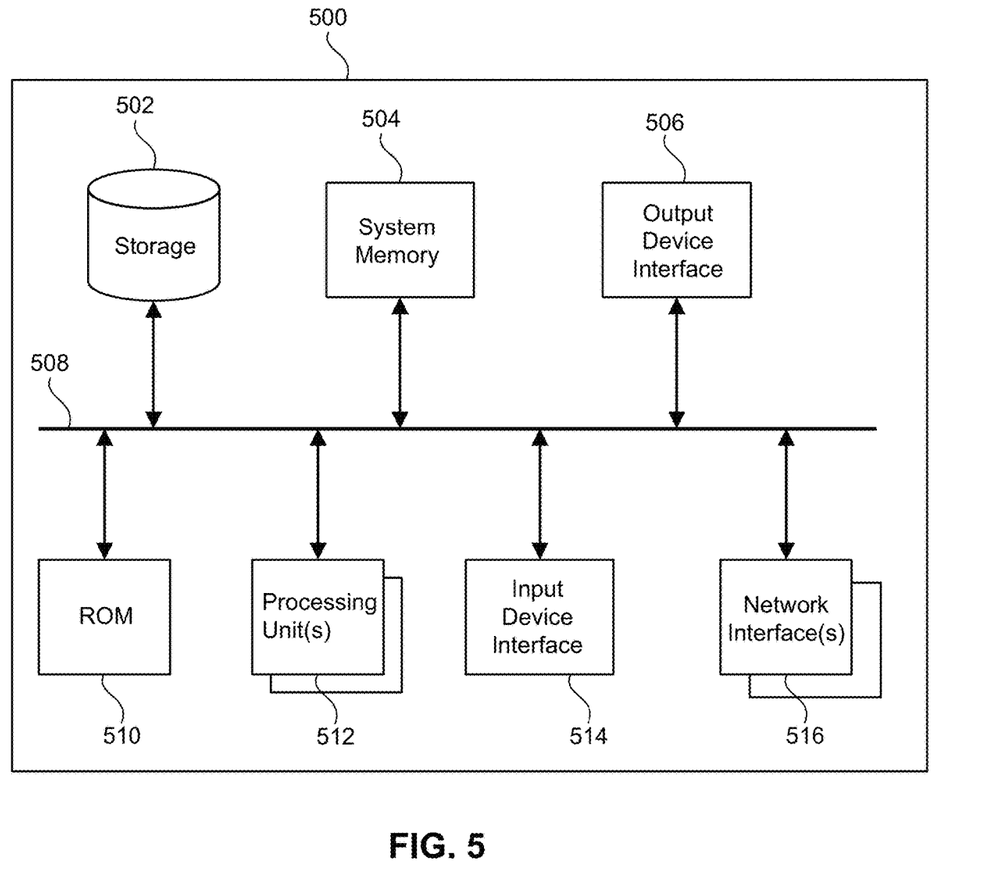
FIG. 5 is a diagram depicting an example electronic system for use in connection with transferring notifications between multiple computing devices.

FIG. 5 is a diagram illustrating an example electronic system 500 for use in connection with transferring notifications between multiple computing devices, according to one or more aspects of the subject technology. Electronic system 500 may be a computing device for execution of software associated with the operation of computing device 100, or one or more portions or steps of process 400, or components and processes provided by FIGS. 1-4. In various implementations, electronic system 500 may be representative of first or second computing device 101, 102, or server 103. In this regard, electronic system 500 may be a personal computer or a mobile device such as a tablet computer, laptop, smartphone, PDA, or other touch screen or television with one or more processors embedded therein or coupled thereto, or any other sort of computer-related electronic device having wireless connectivity.

Electronic system 500 may include various types of computer readable media and interfaces for various other types of computer readable media. In the depicted example, electronic system 500 includes a bus 508, processing unit(s) 512, a system memory 504, a read-only memory (ROM) 510, a permanent storage device 502, an input device interface 514, an output device interface 506, and one or more network interfaces 516. In some implementations, electronic system 500 may include or be integrated with other computing devices or circuitry for operation of the various components and processes previously described.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through network interfaces 516. Network interfaces 516 may include, for example, a wireless access point (e.g., Bluetooth or WiFi) or radio circuitry for connecting to a wireless access point. Network interfaces 516 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 500 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
    displaying a notification at a computing device based on the notification being associated, in a user account, with the computing device;
    displaying one or more graphical elements indicative of one or more additional computing devices associated with the user account, wherein each of the one or more graphical elements includes an indication of at least one application installed at a corresponding one of the one or more additional computing devices, wherein the at least one application is configured to open content of the notification, and wherein the one or more additional computing devices are remote from the computing device;
    receiving, at the computing device, a selection of one of the one or more graphical elements associated with a particular computing device from the one or more additional computing devices and of a particular application installed at the particular computing device, the selection indicating a transfer of the notification from the computing device to the particular computing device; and
    in response to receiving the selection of the one of the one or more graphical elements associated with the particular computing device, providing a signal to a server, remote from the computing device, to dissociate the notification from the computing device in the user account, and to associate the notification with the particular computing device in the user account, wherein the signal includes an indication of the particular computing device and the particular application, and wherein the notification is removed from the computing device such that the notification is no longer displayed by the computing device.

2. The computer-implemented method of claim 1,
    wherein the server is a first server,
    wherein the notification is received from a second server associated with an application operating on the computing device, and
    wherein providing the signal includes providing at least a portion of the notification and an identification of the particular computing device.

3. The computer-implemented method of claim 2,
    wherein providing at least the portion of the notification includes providing a notification identifier for the notification, and
    wherein the notification is stored at the first server indexed by the notification identifier.

4. The computer-implemented method of claim 2, wherein the notification includes application content, the method further comprising:
    receiving, with the notification at the computing device, a description of one or more applications operating on the particular computing device that are capable of displaying the application content.

5. The computer-implemented method of claim 1, further comprising:
    receiving, from a notification service remote from the computing device, an enumeration of the one or more additional computing devices; and
    displaying the one or more graphical elements with the notification, wherein each of the one or more graphical elements is a representation of a respective one of the one or more additional computing devices.

6. The computer-implemented method of claim 1, further comprising:
    receiving, at the computing device, the selection of the one of the one or more graphical elements from a user gesture, wherein the user gesture includes a swipe over a portion of a display screen of the computing device associated with the display of the notification, the swipe revealing the one or more graphical elements.

7. The computer-implemented method of claim 6, wherein the one of the one or more graphical elements is selected in response to the user gesture terminating at a location of the display screen associated with the one of the one or more graphical elements.

8. The computer-implemented method of claim 1, wherein the notification includes a request to execute at least a portion of a software application.

9. A computing device, comprising:
one or more processors;
a display screen; and
a non-transitory computer-readable memory, having instructions stored thereon that, when executed, cause the one or more processors to:
output, for display by the display screen, a notification based on the notification being associated, in a user account, with the computing device;
output, for display by the display screen, one or more graphical elements indicative of one or more additional computing devices associated with the user account, wherein each of the one or more graphical elements includes an indication of at least one application installed at a corresponding one of the one or more additional computing devices, wherein the at least one application is configured to open content of the notification, and wherein the one or more additional computing devices are remote from the computing device;
receive a selection of one of the one or more graphical elements associated with a particular computing device from the one or more additional computing devices and of a particular application installed at the particular computing device, the selection indicating a transfer of the notification from the computing device to the particular computing device; and
in response to receiving the selection of the one of the one or more graphical elements, output a signal to a server, remote from the computing device, to dissociate the notification from the computing device in the user account, and to associate the notification with the particular computing device in the user account, wherein the signal includes an indication of the particular computing device and the particular application, and wherein the notification is removed from the computing device such that the notification is no longer output for display by the display screen.

10. The computing device of claim 9,
wherein the server is a server,
wherein the notification is received from a second server associated with an application installed at on the computing device, and
wherein the signal further includes at least a portion of the notification.

11. The computing device of claim 10, wherein the notification comprises application content, and wherein the instructions, when executed, cause the one or more processors to:
receive, a description of one or more applications installed at on the particular computing device that are configured to display the application content.

12. The computing device of claim 9, wherein the instructions, when executed, cause the one or more processors to:
receive, from a notification service remote from the computing device, an enumeration of the one or more additional computing devices; and
output, for display, the one or more graphical elements with the notification, wherein each of the one or more graphical elements is a representation of a respective one of the one or more additional computing devices.

13. The computing device of claim 9, wherein the selection is responsive to detecting a user gesture, and wherein the user gesture includes a swipe over a portion of a display screen of the computing device associated with the display of the notification, the swipe revealing the one or more graphical elements.

14. The computing device of claim 13, wherein the one of the one or more graphical elements is selected in response to the user gesture terminating at a location of the display screen associated with the one of the one or more graphical elements.

15. A non-transitory machine-readable media including instructions that, when executed, cause one or more processors of a computing device to:
output, for display, a notification based on the notification being associated, in a user account, with the computing device;
output, for display, one or more graphical elements indicative of one or more additional computing devices associated with the user account, wherein each of the one or more graphical elements includes an indication of at least one application installed at a corresponding one of the one or more additional computing devices, wherein the at least one application is configured to open content of the notification, and wherein the one or more additional computing devices are remote from the computing device;
receive a selection of one of the one or more graphical elements associated with a particular computing device from the one or more additional computing devices and of a particular application installed at the particular computing device, the selection indicating a transfer of the notification from the computing device to the particular computing device; and
in response to receiving the selection of the one of the one or more graphical elements, output a signal to a server, remote from the computing device, to dissociate the notification from the computing device in the user account, and to associate the notification with the particular computing device in the user account, wherein the signal includes an indication of the particular computing device and the particular application, and wherein the notification is removed from the computing device such that the notification is no longer output for display.

16. The non-transitory machine-readable media of claim 15, wherein the instructions, when executed, cause the one or more processors to:
receive, from a notification service remote from the computing device, an enumeration of the one or more additional computing devices; and
output, for display, the one or more graphical elements with the notification, wherein each of the one or more graphical elements is a representation of a respective one of the one or more additional computing devices.

17. The non-transitory machine-readable media of claim 15, wherein the selection is responsive to detecting a user gesture, and wherein the user gesture includes a swipe over a portion of a display screen of the computing device associated with the display of the notification, the swipe revealing the one or more graphical elements.

18. The non-transitory machine-readable media of claim 17, wherein the one of the one or more graphical elements is selected in response to the user gesture terminating at a location of the display screen associated with the one of the one or more graphical elements.

19. The non-transitory machine-readable media of claim 15,
   wherein the server is a first server,
   wherein the notification is received from a second server associated with an application installed at the computing device, and
   wherein the signal further includes at least a portion of the notification.

20. The non-transitory machine-readable media of claim 15, wherein the notification comprises application content, and wherein the instructions, when executed, cause the one or more processors to:
   receive a description of one or more applications installed at the particular computing device that are configured to display the application content.

* * * * *